Nov. 7, 1961 M. BENTELE ET AL 3,007,460
COOLING ARRANGEMENT FOR ROTARY MECHANISMS
Filed March 29, 1960 3 Sheets-Sheet 1

INVENTORS
MAX BENTELE
CHARLES JONES
FERDINAND P. SOLLINGER
BY Victor D. Behn
ATTORNEY

INVENTORS
MAX BENTELE
CHARLES JONES
FERDINAND P. SOLLINGER

United States Patent Office 3,007,460
Patented Nov. 7, 1961

3,007,460
COOLING ARRANGEMENT FOR ROTARY
MECHANISMS
Max Bentele, Ridgewood, Charles Jones, Paramus, and
Ferdinand P. Sollinger, Wayne, N.J., assignors to Curtiss-Wright Corporation, a corporation of Delaware
Filed Mar. 29, 1960, Ser. No. 18,317
17 Claims. (Cl. 123—8)

This invention relates to rotary mechanisms and is particularly directed to a liquid cooling system for such mechanisms.

The invention is particularly useful in connection with rotary mechanisms comprising an outer body having a cavity therein and an inner body received within said cavity, said bodies being relatively rotatable and having laterally-spaced parallel axes with said outer body having axially-spaced end walls and a peripheral wall interconnecting said end walls to form said cavity and with said inner body having axially-spaced end faces disposed adjacent to said end walls and an outer surface with a plurality of circumferentially-spaced apex portions engageable with the inner surface of said peripheral wall to form a plurality of working chambers between said two bodies which vary in volume upon relative rotation of said inner and outer bodies. Said inner surface of the peripheral wall of the outer body has a multilobed profile which preferably is an epitrochoid with the number of said lobes preferably being one less than the number of apex portions on said inner body.

By suitable arrangement of porting such rotary mechanisms may be used as fluid motors, fluid pump or combustion engines. The invention is of particular importance in connection with a rotary mechanism designed for use as a rotary combustion engine and will be so described. It will become apparent, however, that the invention is not limited to this specific application.

Such rotary combustion engines also include an intake port for admitting a fuel-air mixture to said chambers, an exhaust port for said chambers and suitable ignition means such that during engine operation the working chambers of the engine have a gas cycle of operation which includes the four phases of intake, compression, expansion and exhaust. This cycle of operation is achieved as a result of relative rotation of said inner and outer bodies and for this purpose both said bodies may rotate or one, preferably the inner body, may rotate while the outer body is stationary.

In such a rotary combustion engine the heat input to the outer body resulting from the engine gas (working fluid) cycle, is not uniform around the periphery of the outer body. This is because each of the various phases of the engine cycle always takes place adjacent to the same portion of the outer body. As a result, the portion of the engine outer body adjacent to which the combustion phase takes place has a much higher heat input rate than other portions of said outer body. Similarly in the case of other rotary mechanisms, the heat input to the outer body, resulting from the cycle of the working fluid, will not be uniform around the periphery of said body.

An object of the present invention resides in the provision, in a rotary mechanism, of a novel liquid cooling system for the outer body which, notwithstanding large variations in the heat input to the outer body around its periphery, will minimize temperature variations in the outer body around its periphery whereby the thermal stresses and/or thermal distortions set up in the outer body during operation are relatively low.

A further object of the invention comprises the provision, in a rotary mechanism, of a novel multi-pass liquid cooling system for the outer body in which the liquid coolant flows back and forth several times between the outer body end walls.

A still further object of the invention is to provide a novel liquid cooling system for a rotary mechanism in which the flow of velocity of the coolant is varied as it flows through the system so that the velocity is relatively high at regions of high heat input to the outer body and is relatively low in regions of low heat input.

It is also an object of the invention to provide a novel liquid cooling system for a rotary mechanism in which the outer body liquid coolant passages disposed in a region of relatively high heat input to the outer body have a relatively low hydraulic diameter compared with the hydraulic diameter of passages disposed in a region of relatively low heat input.

Another object of the invention resides in the provision of a novel liquid cooling system for rotary mechanisms such that said system provides adequate cooling with a minimum quantity of liquid coolant and yet the coolant passages have large flow area for ease of fabrication as well as to minimize clogging. In addition, said coolant flow passages, particularly in regions of high heat input, have smooth hydrodynamic contours, that is, they have no abrupt changes in direction or area. This latter feature serves to avoid the presence of dead spots in the coolant flow passages, that is, spots in the coolant flow passages having little or no flow velocity of the coolant, whereby any vapor produced in said passages is instantly carried away by the coolant flow thereby avoiding hot spots resulting from vapor accumulation.

In accordance with the invention, the outer body of a rotary mechanism has a plurality of passages for flow of a liquid coolant therethrough, said passages extending from one end wall to the other through the peripheral wall of the outer body and in addition each end wall is provided with passage means, which as illustrated is a manifold arrangement, for dividing said liquid coolant passages into a plurality of serially-connected groups of passages such that the flow direction of liquid coolant between said end walls reverses in flowing from one of said passage groups to the next group.

A further feature of the invention resides in connecting said passages so that the serially connected groups of passages are circumferentially spaced about the axis of the rotary mechanism and the passage groups are so connected that the passage group to which the liquid coolant is first supplied preferably is located adjacent to one end of a region of relatively high input to the outer body and said coolant, as it flows through said serially connected groups of passages, progresses around the axis of the outer body preferably in a direction toward the other end of said high heat input region.

Another feature of the invention resides in so proportioning the relative cross-sectional area and heat transfer area of the flow paths of said groups of passages that sufficient heat will be removed from the outer body by the liquid coolant at each of the passage groups to minimize variations in the temperature of the outer body around its periphery. For example, in comparison with a passage group in a region of relatively low heat input to the outer body, in a region of relatively high heat input to the outer body the total flow cross-sectional area of the passage group cooling said high heat input region is made relatively small in order to provide a relatively high flow velocity of the liquid coolant through this region thereby increasing the effectiveness of the liquid coolant in this region. In addition, for a liquid coolant flow passage of given cross-sectional flow area its cooling effectiveness obviously can be increased by increasing its heat transfer surface area. Accordingly, it is evident that for good cooling effectiveness the ratio of the cross-sectional flow area of a liquid flow passage to the perimeter of said area should be low. Four times this ratio is known as the "hydraulic diameter" of a liquid flow passage. Hence, a passage group cooling a region of high heat input to the outer body is made to have a relatively small hydraulic diameter as compared to a passage group in a region of relatively low heat input to said outer body.

Other objects of the invention will become apparent when reading the annexed detailed description in connection with the drawing in which.

Figures 1, 2:
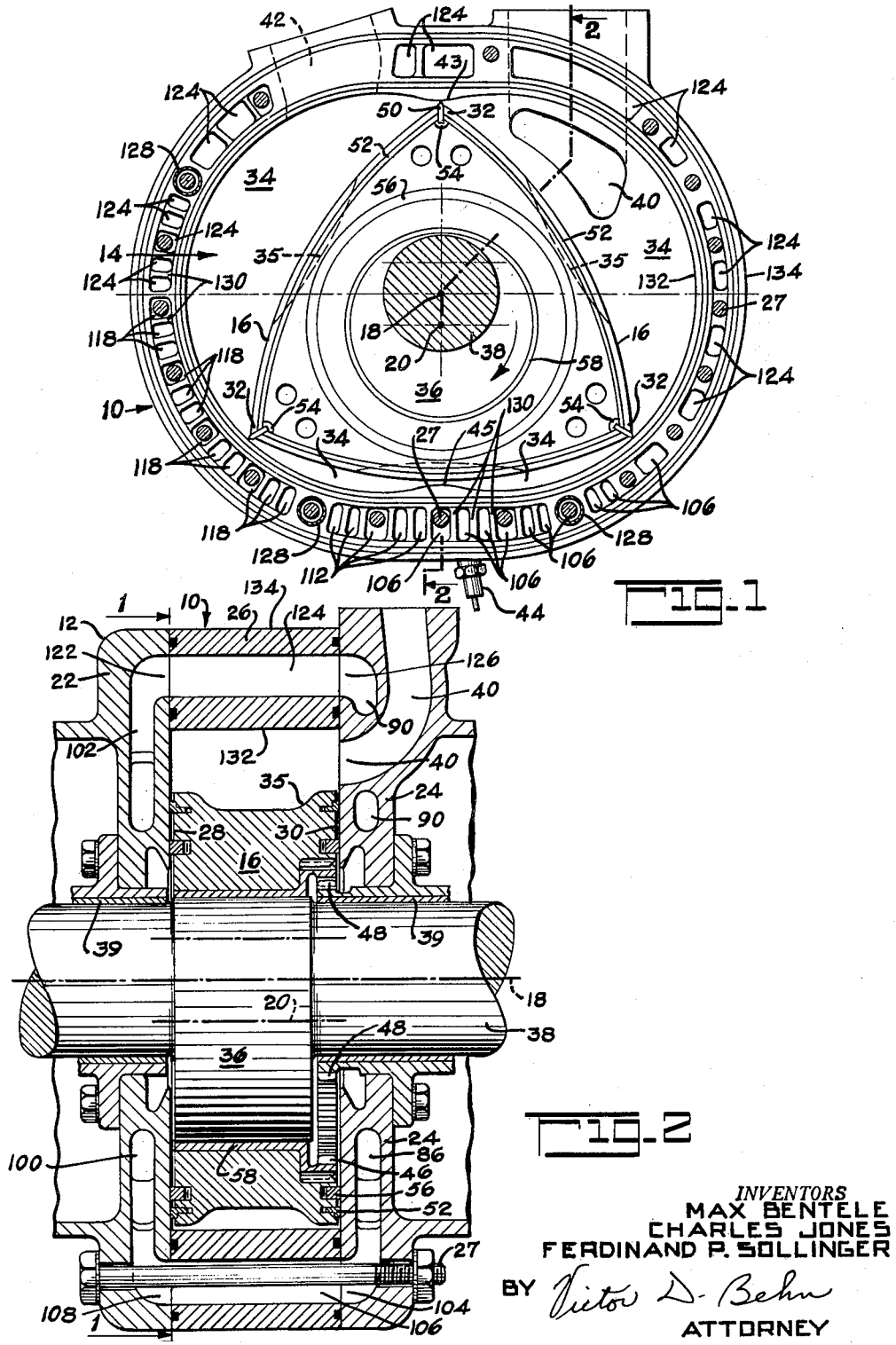
FIG. 1 is a transverse sectional view, taken along line 1—1 of FIG. 2 of a rotary combustion engine embodying the invention.
FIG. 2 is a sectional view taken along the broken line 2—2 of FIG. 1.

Referring first to FIGS. 1 and 2 of the drawing, a rotary internal combustion engine is indicated by reference numeral 10. The engine 10 comprises an outer body 12 having a cavity 14 within which an inner body 16 is received, said bodies being relatively rotatable and having laterally-spaced parallel axes 18 and 20 respectively. The outer body 12 has axially-spaced end walls 22 and 24 and a peripheral wall 26 interconnecting said end walls to form said cavity 14. The walls 22, 24 and 26 are secured together as by bolts 27. In a plane normal to its axis 18, the cavity 14 has a multi-lobed profile which preferably is an epitrochoid. In the specific embodiment illustrated the outer body cavity 14 has two lobes although as will be apparent the outer body cavity may have any number of lobes.

The inner body 16 has axially-spaced end faces 28 and 30 disposed adjacent to said outer body end walls and an outer surface with a plurality of circumferentially-spaced apex portions 32, said apex portions preferably being one more in number than the number of said outer body lobes. Thus as illustrated the inner body has three apex portions 32. The inner body apex portions 32 are in continuous engagement with the multi-lobed inner surface of the outer body to form a plurality (three in the embodiment illustrated) of working chambers 34 between said two bodies which vary in volume upon relative rotation of the inner and outer bodies during engine operation. Between its apex portions the profile of outer surface of the inner body is such as to operate in an interference free manner relative to the outer body. Thus as illustrated the outer surface of the outer body has a triangular profile with outwardly arched sides. Each working chamber 34 includes a trough-like recess 35 in the adjacent side of the outer surface of the inner body 16, said recess forming a substantial part of said chamber during combustion therein.

In the embodiment illustrated, the outer body 12 is stationary while the inner body is journaled on an eccentric portion 36 of a shaft 38. The shaft 38 is supported by bearings 39 carried by the outer body 12 and said shaft is co-axial with the geometrical axis 18 of the outer body 12 while the shaft eccentric portion 36 is co-axial with the inner body 12 which, as stated, is journaled on said eccentric portion. During engine operation the inner body 16 has a planetary motion (clockwise in FIG. 1) about the axis 18 of the outer body whereupon the working chambers 34 vary in volume such that in each rotation of the inner body about the axis 18 of the outer body each chamber 34 has two positions of minimum volume and two positions of maximum volume.

An intake passage 40 for the engine working chambers 34 is provided in the outer body end wall 22 for admitting a fuel-air mixture to the working chamber 34 and an exhaust passage 42 is provided in the peripheral wall 26 for exhausting combustion gases from said chambers, said passages being disposed on opposite sides of a junction 43 of the lobes of the outer body cavity with the exhaust port being on the upstream side of said junction relative to the direction of rotation of the inner rotor. A spark plug 44 is provided in the outer body peripheral wall 26 on the side opposite to the intake and exhaust passages and adjacent to the lobe junction 45 for igniting the combustion mixture in the working chambers 34. As is apparent from the drawing the lobe junctions 43 and 45 are points of minimum radius on the multi-lobed profile of the inner surface of the peripheral wall 26.

During engine operation the working chambers 34 have a cycle of operation including the four phases of intake, compression, expansion and exhaust, said phases being similar to the strokes in a reciprocating-type internal combustion engine having a four-stroke cycle. In order to maintain the relative motion of the inner body relative to the outer body, an internal gear 46 is, as illustrated, secured to the inner body and is disposed co-axially with the axis 20 of said inner body. The internal gear 46 is disposed in mesh with a fixed gear 48 secured to the outer body, said fixed gear being co-axial with the shaft 38. With the profile of the inner surface of the outer body cavity 14 having two lobes and the inner body having three apex portions 32 the ratio of the diameters of the gears 46 and 48 is 3 to 2.

At this point it should be noted that although as illustrated and described the outer body 12 is stationary and the inner body 16 has a planetary motion about the axis 18 of the outer body, it will be apparent that either body may be stationary while the other rotates or both said bodies may rotate in the same direction about their own axes.

For efficient engine operation the working chambers 34 are sealed between the apex portions 32 of the inner body 16 and the peripheral wall 26 of the outer body 12 as well as between the inner body end faces and the outer body end walls 22 and 24. The details of this sealing means for the working chambers 34, however, form no part of the present invention. As illustrated, this sealing means includes apex seal strip means 50 carried by the inner body 16 and extending along each apex portion 32 of said inner body for sealing engagement with the inner surface of the peripheral wall 26 of the outer body 12, and end face sealing elements 52 carried by each end face of the inner body with each end face sealing element 52 extending from one apex portion to the adjacent apex portion of the inner body for sealing engagement with the adjacent end wall of the outer body 12. In addition intermediate seal members 54 are provided at each end of each apex portion of the inner body 16 for sealing cooperation between adjacent ends of the seal means 50 and seal elements 52. An oil seal 56 may also be provided at each end face of the inner body 16 adjacent to the bearing 58 between said inner body 16 and the shaft eccentric 36.

As the engine operates, the various phases of the cycle of the engine working fluid in the working chambers 34 take place adjacent to the same portion of the outer body 12. Thus for each working chamber 34 combustion is initiated by the spark plug 44, which as already described is located adjacent to the lobe junction 45 of the peripheral wall 26 of the outer body. With the inner body 16 in the position of FIG. 1, the lower working chamber 34 is approximately in a position for initiation of combustion in said chamber, combustion preferably having been initiated just prior said chamber 34 reaching this position. Likewise the engine intake port 40 and exhaust port 42 serve each working chamber 34 and these ports are on the side of the outer body opposite to the spark plug 44.

It is apparent, therefore, that as the engine operates the rate of heat input or rejection to the outer body 12, resulting from the cycle of the gas (working fluid) in the working chambers 34, is not uniform about said outer body and instead is greatest on the side of said outer body adjacent to the spark plug 44. The actual distribution of said heat input to the outer body peripheral wall 26 is shown by the polar-type curve 70 of FIG. 4, the magnitude of the rate of heat input per unit area at each point on the inner surface of said peripheral wall 26 being proportional to the radial distance between said point and the curve 70.

Figure 4:
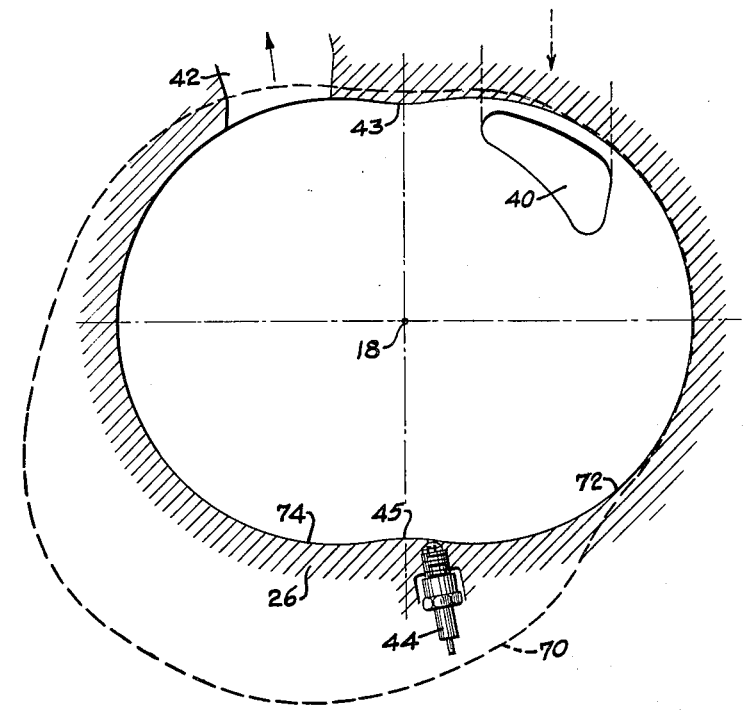
FIG. 4 is a diagrammatic view and polar-type graph showing the relative rates of heat input to the outer body peripheral wall 26 at each position about said wall.

As is apparent from the curve 70 of FIG. 4 the rate of heat input per unit surface area to the outer body peripheral wall 26 suddenly begins to increase adjacent to a point 72 on the inner surface of its peripheral wall 26. As is evident from a comparison of FIGS. 1 and 4, this point 72 corresponds approximately to the position of the trailing end of a combustion chamber 34 (clockwise end of the lower combustion chamber 34 in FIG. 1) as combustion is initiated in said chamber. From the point 72 the heat input to the outer body increases in a clockwise direction about the axis 18 of said outer body approximately to a point 74 on said inner surface and then proceeds to fall off so that at the exhaust port 42 the rate of heat input per unit surface area to the outer body peripheral wall 26 is already quite small. From the intake port 40 clockwise to the point 72 the heat input to the outer body is a minimum.

At this point it should be emphasized that the curve 70 represents the heat input to the outer body peripheral wall 26 per unit surface area of said wall exposed to the working fluid. This area is uniform around said peripheral wall except in the vicinity of the exhaust passage 42. For example, in the vicinity of the exhaust passage 42 the total surface area of the outer body peripheral wall 26 exposed to the combustion gases is suddenly increased by virtue of the surface area of said exhaust passage. Hence, the total heat input rate to the outer body peripheral wall 26 in the vicinity of the exhaust passage 42 is much greater than the total heat input rate on either side of said exhaust passage although the heat input per unit surface area (curve 70) is about the same.

It is apparent therefore that the cooling requirements of the outer body 12 vary considerably about its periphery. A liquid coolant such as water is circulated through passages in the outer body, now to be described, for the purpose of adequately cooling said body so as to minimize variations in the temperature of said outer body about its periphery.

Figure 3:
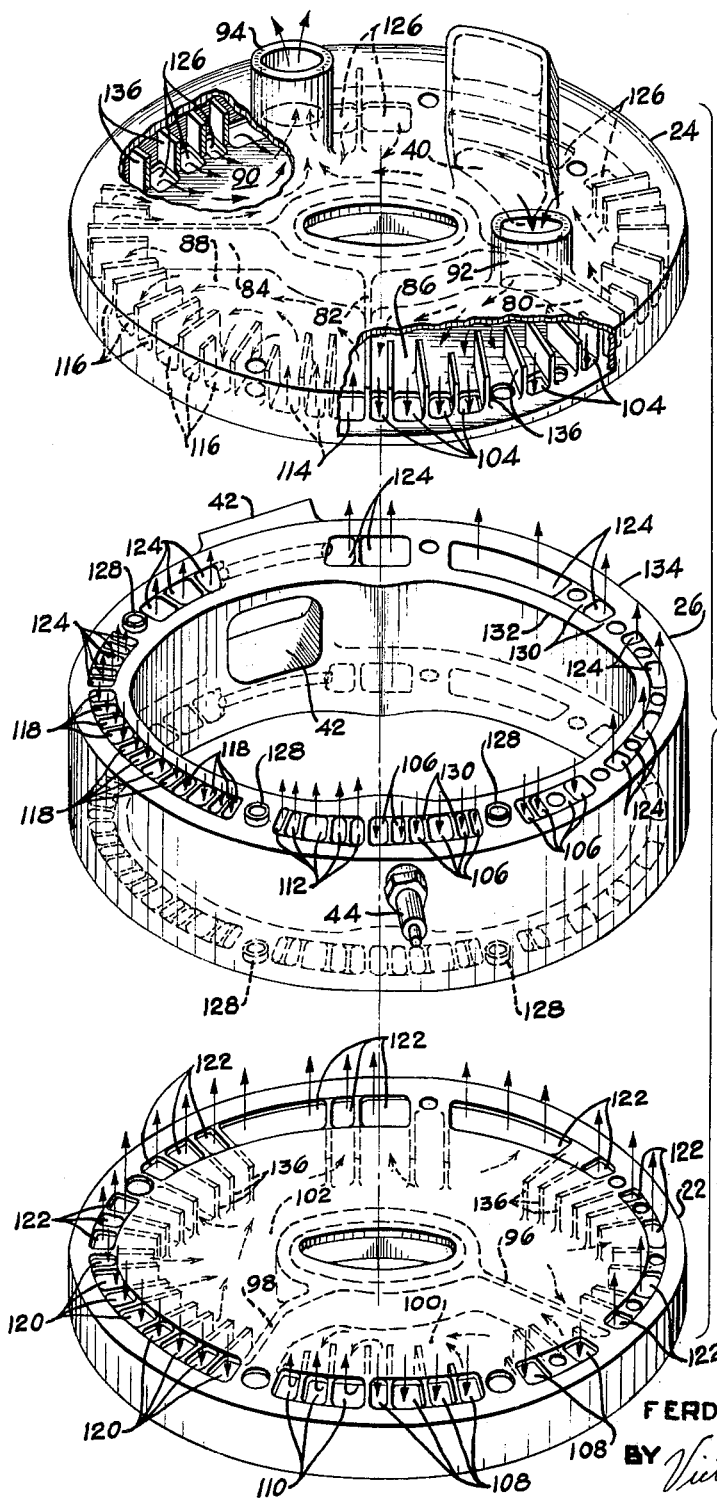
FIG. 3 is an exploded perspective view partly in section of the two end walls and intermediate or peripheral wall of the outer body shown in FIG. 1 but with the outer surface of the end walls somewhat simplified for convenience of illustration.

The cooling passage structure of the outer body 12 is best seen in the exploded view of FIG. 3. As there shown, the end wall 24 is provided with a hollow interior which is divided by partitions 80, 82 and 84 into three manifold sections 86, 88 and 90. The manifold section 86 has an inlet conduit connection 92 for the supply of a liquid coolant thereto and the manifold section 90 has an outlet conduit connection 94 for the liquid coolant. Similarly the end wall 22 has a hollow interior which is divided by partitions 96 and 98 into two manifold sections 100 and 102.

The inlet manifold section 86 of the hollow end wall 24 has a plurality of outlet openings 104 which register with the adjacent end of a first group of passages 106 extending through the peripheral wall 26. The other ends of the passages 106 of the peripheral wall 26 register with openings 108 in the hollow end wall 22, the openings 108 communicating with the manifold section 100 within said latter hollow end wall. The manifold section 100 of the end wall 22 also has a relatively small number of additional openings 110 which register with the adjacent ends of a second group of passages 112 extending through the peripheral wall 26. The other ends of the passages 112 register with openings 114 in the hollow end wall 24, the openings 114 communicating with the manifold section 88. The manifold section 88 in the end wall 22 has a number of additional openings 116 (larger in number than the number of openings 114) which register with the adjacent ends of a third group of passages 118 extending through the peripheral wall 26. The other ends of the passages 118 register with openings 120 in the hollow end wall 22, the openings 120 communicating with the manifold section 102 in the end wall 22. The manifold section 102 has a relatively large number of additional openings 122 which register with the adjacent ends of a fourth group of passages 124 extending through the peripheral wall 26. The other ends of the passages 124 register with openings 126 in the hollow end wall 24, the openings 126 communicating with the outlet manifold section 90 of said end wall 24. The passages 106, 112, 118 and 124 preferably are all parallel to each other and to the engine axis 18.

With this passage construction of the outer body 12, liquid coolant is supplied under pressure (by pump means not shown) to the inlet connection 92. From the inlet connection 92 the liquid coolant fills the manifold section 86 in the end wall 24 and flows out through openings 104 into the first group of passages 106 in the peripheral wall 26. The circumferentially most counterclockwise of the passages 106 is approximately in the region of the point 72 on the inner surface of the peripheral wall 26 at which heat input to said wall becomes substantial as shown in FIG. 4. Thus the group of passages 106 lie in the region in which combustion is initiated in the working chambers 34. The coolant flows downward (as viewed in FIG. 3) through the passages 106 and then through openings 108 into the manifold 100 in the end wall 22. From the manifold 100 the liquid coolant flows back up through openings 110 in said manifold 100 and up through the second group of passages 112 in the peripheral wall 26 and then through openings 114 into the next manifold 88 in the end wall 24. From the manifold 88 the liquid coolant flows back down through openings 116 in said manifold 88 and down through the third group passages 118 in the peripheral wall 26 and then through openings 120 into the manifold 102 in the end wall 22. From the manifold 102 the liquid coolant flows back up through openings 122 in said manifold and up through the fourth group of passages 124 in the peripheral wall 26 and then through openings 126 into the outlet manifold 88 in the end wall 24. From the outlet manifold 88 the liquid coolant flows out through the outlet connection 94 from which it is circulated back to the inlet connection 92 after passing through a suitable cooling radiator (not shown).

From what has been said it should be apparent that the hollow end wall 24 is divided by partitions 80, 82 and 84 into three separate manifolds 86, 88 and 90 and that the hollow end wall 22 is divided by partitions 96 and 98 into two separate manifolds 100 and 102 and that the groups of passages 106, 112, 118 and 124 through the peripheral wall 26 are connected in series by said manifolds such that the liquid coolant flows back and forth between the end walls 22 and 24 first in one direction through the first group passages 106 in the peripheral wall 26 and then flows in series through the remaining groups of passages 112, 118 and 124, the flow direction through the peripheral wall reversing from one of said groups of passages to the next. Except for the inlet and outlet manifolds 86 and 90 each manifold is connected to two of said passage groups such that the liquid coolant flows into the manifold from one passage group and out from the manifold through the other passage group. It is also apparent that the passage groups 106, 112, 118 and 124 are spaced circumferentially about the axis of the outer body so that the liquid coolant flows in series through said passage groups it progresses clockwise (FIGS. 3 and 4) around the axis of the outer body, from the vicinity of the point 72 at which because of initiation of combustion high heat input into the outer body 12 begins, toward the other end (adjacent the exhaust port 42) of said high heat input region. With this arrangement the first group of passages 106 is disposed adjacent to one end of the high heat input region of the outer body 12 and as the liquid coolant flows through the other groups of passages (112, 118 and 124) it progresses around the periphery of the outer body 12 in a direction toward the other end of said high heat input region and then into the region in which there is little or no heat input into the outer body. Obviously, the first group of liquid coolant passages could be disposed at either end of said high heat input region of the outer body and the serially-connected passage groups could be arranged so that the liquid coolant progresses around the periphery of the outer body in a direction toward the other end of said region. It is preferred, however, to start the coolant flow, as illustrated, adjacent to the combustion initiation end (point 72) of the high heat input region because of the relatively abrupt rise of the heat input to the outer body 12 at this end. The last or most downstream of said groups of passages, namely, the passages 124, are then in the region of the outer body having the lowest rate of heat input to the outer body 12.

The cooling system may be designed for only a relatively small temperature rise of the liquid coolant as it flows through the outer body 12 in which case the direction of flow around the outer body and the location of the inlet and outlet ends of the coolant flow relative to the location of the high heat input region becomes less important.

As already indicated the cooling effectiveness of a liquid coolant flow passage can be increased by decreasing its cross-sectional flow area to provide for increased flow velocity and/or the cooling effectiveness of a passage of given cross-sectional flow area can be increased by increasing the perimeter of said flow area. Hence, for good cooling effectiveness of a liquid flow passage the ratio of its flow cross-sectional area to heat transfer area should be relatively low. In other words for relatively high cooling effectiveness a liquid coolant flow passage should have relatively low hydraulic diameter and for relatively low cooling effectiveness said passage should have a larger hydraulic diameter.

With the above in mind the group of passages 112 which, as is apparent from FIGS. 3 and 4, is in the region of highest heat input to the outer body 12, is provided with a relatively small cross-sectional flow area. This is evident from the relatively small number of passages 112 in this group. In contrast the group of passages 124, in the region of lowest heat rejection to the outer body, has a total cross-sectional flow area which is relatively large as is evident from the greater number of passages in this group. The total cross-section of flow area of each of the remaining two groups of passages 106 and 118 is intermediate that of the large area group 124 and the small area group 112. Since the passage groups 106, 112, 118, and 124 are connected in series the flow velocity of the liquid coolant will be greatest through the small area passage group 112 and slowest through the large area passage group 124. Hence, from the standpoint of flow velocity, the liquid coolant will have its maximum cooling effectiveness in the region of the passage group 112 where the heat input to the outer body is a maximum and will have its minimum cooling effectiveness in the region of the passage group 124 where the heat input to the outer body is a minimum. Also the group of passages 112 in the region of highest heat input to the outer body 12 is shaped to have a relatively large heat transfer surfaces area compared to its flow area by making each individual passage 112 of relatively small circumferential width. This is in contrast to the relatively large circumferential width of at least some of the individual passages 124 in the region of low heat input to the outer body. It is clear, therefore, that the hydraulic diameter of the group of passages 112 is smaller and the hydraulic diameter of the group of passages 124 is larger than that for the other groups of passages.

With the cooling passage construction shown and described large temperature variations around the outer body 12 are avoided notwithstanding the extreme non-uniformity of the heat input to said outer body as shown in FIG. 4. Thermal stresses and thermal distortions in the outer body 12 are thereby minimized. At the same time the cooling system with its serially connected groups of flow passages requires only a minimum quantity of liquid coolant. In addition the coolant passages are sufficiently large for ease of fabrication and for avoidness of passage clogging.

It should also be noted that the serially-connected groups passages 106, 112 and 118 for the high heat input region to the outer body 12 have no abrupt change in direction or flow area. Because of this smooth hydrodynamic contour of the passages 106, 112 and 118 there are no locations in said passages having little or no flow velocity of the liquid coolant and therefore any vapor accumulation in said passages is instantly carried away by the coolant flow. This smooth hydrodynamic contour of the liquid coolant passages avoids hot spots that might otherwise be formed in said regions of high heat input to the outer body if vapor were permitted to accumulate at certain spots in the liquid coolant passages.

As illustrated, in FIGS. 1 and 3 the discharge portion of the inlet passage 40 for the engine air or air-fuel charge passes through the liquid coolant manifold section 90 whereby this portion of the inlet passage passes through and is surrounded by the liquid coolant. The liquid coolant in the manifold section 90 will be at a higher temperature than that of the charge entering the engine through said inlet passage whereby said liquid will serve to heat the incoming charge thereby, in the case of a fuel-air charge, helping to vaporize the fuel in said charge.

Also it should be noted that the liquid coolant manifold sections 102 and 190 in the two end walls 22 and 24 and the liquid coolant passages 124 in the peripheral wall 26 extend over a portion of the outer body 12 including the region in which a relatively cool fresh charge is drawn into the engine. In this region, therefore, the walls of the outer body tend to run relatively cool. However, the relatively warm liquid coolant in these manifold sections 102 and 90 and in the passages 124 serves to heat this intake charge region of the outer body thereby further minimizing temperature variations around the outer body.

With the cooling arrangement described, the liquid coolant passages 106, 112, 116 and 118 in effect give the peripheral wall 26 a hollow construction in which the walls 130 between the individual liquid coolant passages function as webs interconnecting the radially inner and outer wall portions 132 and 134 of said hollow peripheral wall 26. The outer wall portion 134 of the hollow peripheral wall 26 maintains a substantially uniform temperature during engine operation because it is relatively remote from the heat input side of its wall 26 and because of its exposure to the surrounding atmosphere. Accordingly, and because of the interconnecting webs 130 the outer wall portion 134 of the peripheral wall 26 serves to maintain the profile of the inner wall portion 132 notwithstanding some variation in the temperature of said inner portion around its periphery during engine operation. It should also be noted that the thickness of the inner wall portion 132 of the peripheral wall 26 at any section of said wall in a plane including the engine axis 18 is uniform from one axial end of the wall to the other. This feature also serves to reduce thermal stresses and thermal distorting of said inner wall portion 132. Similarly, ribs 136, along with manifold partitions 80, 82, 84, 96 and 98 interconnect the outer and inner wall portions of the hollow end walls 22 and 24 whereby the relatively cool outer portions of said hollow end walls serve to keep their inner portions flat.

The bolts 27 securing the outer body walls 22, 24 and 26 together pass through certain of the passages in the peripheral wall and therefore these passages are made wide enough to accommodate said bolts and for flow of liquid coolant around said bolts. For reasons of clarity the bolts 27 have been omitted in FIG. 3. The liquid coolant thereby also serves to provide effective cooling of said bolts thereby minimizing loss of strength and clamping force of said bolts. Hollow pins 128 project axially from the peripheral wall 26 about certain of the bolts 27 for the purpose of accurately aligning the walls 22, 24, and 26, there being sufficient clearance, however, between said hollow pins 128 and their associated bolts 27 to provide an effective liquid coolant flow passage therebetween.

The invention obviously is not limited to the specific rotary mechanism described. For example, an intake passage may be provided in the end wall 24 and/or in the peripheral wall 26 in addition to or in lieu of the intake passage 40 and similarly an exhaust passage could be provided in one or both end walls 22 and 24 in addition to or in lieu of the exhaust passage 42. Such porting variations for the rotary combustion engine 10 would not, however, materially change the general nature of the variation of the heat input to the outer body about its periphery from that illustrated in FIG. 4 and therefore the same general arrangement of coolant passage groups described would be equally satisfactory for rotary combustion engines with such modified porting.

The invention is also applicable to rotary mechanisms having a general configuration different from that illustrated. For example the profile of the inner surface of the outer body could be a three-lobed instead of a two-lobed epitrochoid with the inner body having a generally square instead of the generally triangular shape illustrated. In addition as previously stated the invention is applicable to rotary mechanisms used as fluid motors and fluid pumps. For such rotary mechanisms the distribution of the heat input to the outer body about its periphery in general will differ from that shown in FIG. 4. In applying the invention to such rotary mechanisms the circumferentially-spaced serially-connected groups of passages for the liquid coolant are arranged, as in the case of the engine 10, so that the passage group in a region of relatively high heat input is such as to have a relatively small hydraulic diameter as compared to a passage group in a region of relatively low heat input. Also the group of passages to which the coolant is first supplied preferably is located adjacent to one end of a high heat input region of the outer body and the groups of passages are so disposed that the coolant progresses toward the other end of said high heat input region.

As described, the outer body cooling passage arrangement consists of four circumferentially-spaced serially-connected passage groups 106, 112, 118 and 124. It should be apparent, however, that, both as to the rotary combustion engine 10 as well as to other forms of rotary mechanisms, the invention obviously is not limited to this specific number of such passage groups.

Figure 5:
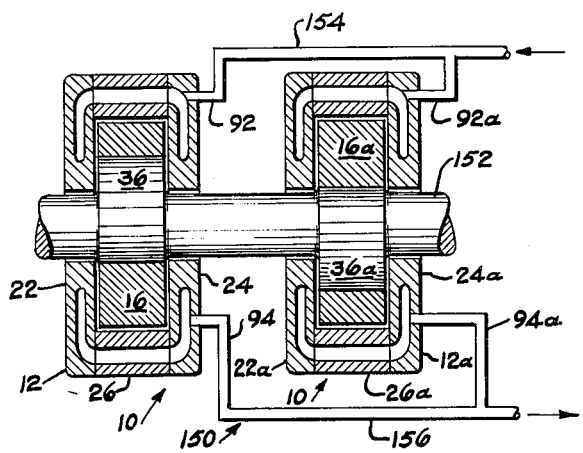
FIG. 5 is a schematic view of the invention applied to a multi-unit rotary combustion engine.

The engine 10 may be termed a single unit rotary combustion engine. A plurality of such engine units may obviously be connected to the same shaft much as a plurality of pistons of a conventional reciprocating-type combustion engine are connected to the same shaft. The liquid coolant arrangement described can advantageously also be applied to such multi-unit rotary combustion engines. FIG. 5 shows, for example, a two-unit rotary combustion engine having a single shaft 152 with each unit otherwise being similar to the engine 10. For ease of understanding the parts of the one rotary combustion engine unit have been designated by the same reference numerals as the parts of the engine 10 and the parts of the other unit have been designated by the same reference numerals but with a subscript *a* added thereto. Also for reasons of simplicity details such as gearing, seals, etc. have been omitted from FIG. 5.

As shown the two eccentric portions 36 and 36a of the shaft 152 are 180° out of phase. However, the relative angular positions of said eccentrics forms no part of the present invention.

The liquid inlet conduit connections 92 and 92a for the two outer bodies 12 and 12a of the two-unit engine 150 are connected to a common liquid supply manifold 154 while the outlet conduit connections 94 and 94a are connected to a common outlet manifold 156. With this arrangement the liquid coolant flow through the two (or more) units of the engine is in parallel between the liquid manifolds 154 and 156. Each outer body 12 and 12a is provided with the same liquid coolant passage arrangement illustrated and described for the engine 10 with respect to its heat input distribution (curve 70). Accordingly, corresponding portions of the outer bodies 12 and 12a of the two rotary engine units 10 and 10a receive identical cooling. For example, the high heat input region of the outer body 12 in which combustion takes place is cooled to the same extent as the corresponding high heat input region of the outer body 12a.

In FIG. 5, the adjacent end walls 24 and 22a of the two outer bodies 12 and 12a are spaced apart in order to more clearly show the parallel liquid coolant arrangement for said outer bodies 12 and 12a of the engine. In an actual engine, however, said two walls 24 and 22a would not be so spaced and instead would be disposed in abutting engagement to form a common wall for said two outer bodies.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A rotary mechanism employing a working fluid; said mechanism comprising an outer body having a cavity with spaced end walls and a peripheral wall; at least one inner body received within said cavity to form working chambers between the inner and outer bodies which vary in volume during operation of said mechanism such that a relatively high temperature phase of the working fluid cycle always takes place in said chambers adjacent to a first portion of the peripheral wall of the outer body and a relatively low temperature phase of the working fluid cycle always takes place in said chambers adjacent to a second portion of the outer body peripheral wall; said outer body having a plurality of passages extending from one end wall to the other through its peripheral wall for flow of a liquid coolant therethrough; and passage means in each end wall for connecting said passages into a plurality of serially-connected groups of passages such that the flow direction of the liquid coolant between said end walls reverses in flowing from one of said passage groups to the next.

2. A rotary mechanism as claimed in claim 1 in which said groups of passages are spaced about the peripheral wall of said outer body.

3. A rotary mechanism as claimed in claim 2 and including a supply passage for supplying liquid coolant first to that one of said groups of passages which is disposed at one end of a region of relatively high heat input to the outer body peripheral wall and in which said end wall passage means directs said coolant from said one group of passages in series through the other groups of passages such that in flowing through said circumferentially-spaced passage groups the liquid coolant progresses around the periphery of the outer body.

4. A rotary mechanism as claimed in claim 3 in which the total cross-sectional flow area of the passages of the most downstream of said passage groups is larger than the corresponding flow area of other of said passage groups.

5. A rotary mechanism as claimed in claim 3 in which the hydraulic diameter of the most downstream of said passage groups is larger than that of other of said passage groups.

6. A rotary mechanism as claimed in claim 1 in which the total cross-sectional flow area of the passages of at least one group differ from the total cross-sectional flow area of the passages of at least one other group.

7. A rotary mechanism as claimed in claim 1 in which said end wall passage means comprises a plurality of individual manifolds in each end wall, said manifolds including an inlet manifold and an outlet manifold respectively communicating with opposite ends of said serially-connected groups of passages and an additional manifold connected between each adjacent pair of said serially-connected groups of passages for flow therein from one of its associated pair of passage groups and flow therefrom into the other passage group of said pair.

8. A rotary mechanism as claimed in claim 7 in which said passage groups are so disposed and connected that as the liquid coolant flows serially through the passage groups it progresses around the periphery of the outer body.

9. A rotary mechanism as claimed in claim 1 in which the passages of a first group disposed in a region of relatively high heat input to the outer body have a total cross-sectional flow area which is less than that for the passages of a second group disposed in a region of a relatively low heat input to the outer body.

10. A rotary mechanism as claimed in claim 1 in which the passages of a first group disposed in a region of relatively high heat input to the outer body have a hydraulic diameter which is less than that for the passages of a second group disposed in a region of relatively low heat input to the outer body.

11. A rotary mechanism as claimed in claim 1 in which the mechanism comprises a single inner body received within the outer body cavity, said bodies being relatively rotatable about laterally-spaced parallel axes with the end walls of the outer body being axially spaced and said inner body having axially spaced end faces disposed adjacent to said end walls and an outer surface with a plurality of circumferentially-spaced apex portions engageable with the inner surface of said peripheral wall to form said working chambers.

12. A rotary mechanism as claimed in claim 1 in which said mechanism is a combustion engine and including a supply passage for supplying liquid coolant first to that one of said groups of passages which is disposed adjacent to the combustion initiation end of a region of relatively high heat input into the outer body peripheral wall and from which group said coolant flows in series through the other groups of passages.

13. A rotary combustion engine as claimed in claim 12 in which the downstream one of said serially connected groups of passages has a total cross-sectional flow area which is larger than that of any of the other groups.

14. A rotary combustion engine as claimed in claim 12 in which said serially-connected groups of passages are circumferentially-spaced about the periphery of said outer body and are disposed so that in flowing through said serially-connected passage groups the liquid coolant progresses around the periphery of the outer body from said combustion initiation end of said high heat input region in a direction toward the other end of said region.

15. A rotary combustion engine as claimed in claim 12 in which the combined cross-sectional area of the passages of the most downstream of said passage groups is larger than the corresponding area of any of the other groups.

16. A rotary mechanism as claimed in claim 1 in which said mechanism is a combustion engine having an intake passage for the engine charge, said intake passage having its discharge portion disposed in heat exchange relation with the liquid coolant in the outer body.

17. A rotary combustion engine as claimed in claim 16 in which said intake passage discharge portion is disposed in heat exchange relation with said liquid coolant adjacent to the downstream end of said serially-connected groups of passages.

References Cited in the file of this patent
FOREIGN PATENTS

| | | |
|---|---|---|
| 14,839 | Great Britain | 1885 |
| 642,312 | Great Britain | Aug. 30, 1950 |